United States Patent
Ryon et al.

(10) Patent No.: US 11,773,784 B2
(45) Date of Patent: Oct. 3, 2023

(54) FUEL INJECTORS WITH TORCH IGNITORS

(71) Applicant: Delavan Inc., West Des Moines, IA (US)

(72) Inventors: Jason Ryon, Carlisle, IA (US); Lev A. Prociw, Johnston, IA (US); Brandon Phillip Williams, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 45 days.

(21) Appl. No.: 17/499,527

(22) Filed: Oct. 12, 2021

(65) Prior Publication Data
US 2023/0110714 A1    Apr. 13, 2023

(51) Int. Cl.
*F02C 7/264*       (2006.01)
*F23R 3/12*        (2006.01)
*F23R 3/28*        (2006.01)

(52) U.S. Cl.
CPC .............. *F02C 7/264* (2013.01); *F23R 3/12* (2013.01); *F23R 3/28* (2013.01); *F23R 3/286* (2013.01); *F05D 2220/32* (2013.01); *F05D 2240/35* (2013.01); *F23R 2900/00009* (2013.01)

(58) Field of Classification Search
CPC .................................. F23Q 9/00; F02P 21/00
See application file for complete search history.

(56) References Cited

U.S. PATENT DOCUMENTS

| | | | | |
|---|---|---|---|---|
| 2,814,339 A | * | 11/1957 | Aubert | F23Q 9/00 60/39.821 |
| 2,852,642 A | * | 9/1958 | Cromwell | G01K 5/16 374/E5.01 |
| 3,009,321 A | * | 11/1961 | Jones | F02C 7/264 60/39.821 |
| 3,361,183 A | * | 1/1968 | Reichhelm | F23C 99/00 431/208 |
| 4,012,904 A | * | 3/1977 | Nogle | F23R 3/34 60/737 |
| 4,112,675 A | | 9/1978 | Pillsbury et al. | |
| 4,412,414 A | * | 11/1983 | Novick | F23R 3/12 60/39.23 |

(Continued)

FOREIGN PATENT DOCUMENTS

| | | | | |
|---|---|---|---|---|
| EP | 2500641 A1 | * | 9/2012 | F23C 9/006 |
| GB | 1381719 A | | 1/1975 | |

OTHER PUBLICATIONS

Extended European Search Report dated Mar. 3, 2023, issued during the prosecution of European Patent Application No. EP 22200776.7.

*Primary Examiner* — Gerald L Sung
(74) *Attorney, Agent, or Firm* — Locke Lord LLP; Joshua L. Jones; Scott D. Wofsy (57) ABSTRACT

A fuel injector includes a fuel nozzle configured to issue a spray of fuel from a fuel outlet in a downstream direction along an injection axis. The fuel nozzle includes a nozzle body that defines a main flow passage therethrough. An injection fuel line is in fluid communication with the fuel nozzle to supply fuel to the fuel nozzle. A torch ignitor with a flame outlet opens into the main flow passage of the fuel nozzle for issuing flame into the main flow passage. The flame outlet meets the main flow passage at a position that is downstream of the fuel outlet with respect to the downstream direction along the injection axis.

19 Claims, 7 Drawing Sheets

(56) References Cited

U.S. PATENT DOCUMENTS

| | | | | |
|---|---|---|---|---|
| 4,787,208 A | * | 11/1988 | DeCorso | F23C 6/045 |
| | | | | 60/753 |
| 4,854,857 A | * | 8/1989 | Houtman | F23D 14/20 |
| | | | | 431/258 |
| 4,860,533 A | | 8/1989 | Joshi | |
| 5,469,700 A | * | 11/1995 | Corbett | F02C 9/28 |
| | | | | 60/776 |
| 6,182,436 B1 | * | 2/2001 | Prociw | F23R 3/32 |
| | | | | 60/776 |
| 6,912,857 B2 | | 7/2005 | Schmotolocha et al. | |
| 7,571,598 B2 | | 8/2009 | O'Brien et al. | |
| 8,044,319 B2 | | 10/2011 | Prociw et al. | |
| 9,957,936 B2 | | 5/2018 | Konczol et al. | |
| 10,584,639 B2 | | 3/2020 | Dam et al. | |
| 10,711,699 B2 | | 7/2020 | Dam et al. | |
| 10,815,893 B2 | | 10/2020 | Kleckler et al. | |
| 2004/0031257 A1 | * | 2/2004 | Schmotolocha | F23Q 13/00 |
| | | | | 60/39.826 |
| 2004/0168442 A1 | | 9/2004 | Schmotolocha et al. | |
| 2005/0053876 A1 | | 3/2005 | Joos et al. | |
| 2010/0293953 A1 | | 11/2010 | Wilbraham | |
| 2011/0041508 A1 | | 2/2011 | Karlsson et al. | |
| 2011/0287373 A1 | | 11/2011 | Stanton | |
| 2012/0047903 A1 | | 3/2012 | Williams et al. | |
| 2013/0143171 A1 | * | 6/2013 | Soda | F23Q 13/04 |
| | | | | 431/353 |
| 2014/0366505 A1 | * | 12/2014 | Prociw | F02C 7/266 |
| | | | | 60/39.821 |
| 2015/0345788 A1 | * | 12/2015 | Miyata | C10J 3/726 |
| | | | | 431/353 |
| 2017/0350590 A1 | | 12/2017 | Choudhri et al. | |
| 2018/0128490 A1 | * | 5/2018 | Boardman | F23R 3/283 |
| 2019/0010872 A1 | | 1/2019 | Dam et al. | |
| 2019/0017441 A1 | | 1/2019 | Venkatesan et al. | |
| 2021/0215100 A1 | | 7/2021 | Head et al. | |
| 2022/0397274 A1 | * | 12/2022 | Itoh | F23R 3/343 |

\* cited by examiner

FUEL INJECTORS WITH TORCH IGNITORS

BACKGROUND

1. Field

The present disclosure relates to fuel injection and ignition, and more particularly to fuel injection and ignition in gas turbine engines.

2. Description of Related Art

A small, independent torch igniter system offers many advantages for gas turbine engines. It offers an independent heat source from the main combustor which is used to ignite, stabilize, and relight the main combustor. The isolated nature of this system allows it to be stable regardless of the conditions within the main combustor. A torch ignitor can provide rapid relight capabilities.

The conventional techniques have been considered satisfactory for their intended purpose. However, there is an ever present need for improved systems and methods for improved torch ignitor systems and methods. This disclosure provides a solution for this need.

SUMMARY

A fuel injector includes a fuel nozzle configured to issue a spray of fuel from a fuel outlet in a downstream direction along an injection axis. The fuel nozzle includes a nozzle body that defines a main flow passage therethrough. An injection fuel line is in fluid communication with the fuel nozzle to supply fuel to the fuel nozzle. A torch ignitor with a flame outlet opens into the main flow passage of the fuel nozzle for issuing flame into the main flow passage. The flame outlet meets the main flow passage at a position that is downstream of the fuel outlet with respect to the downstream direction along the injection axis.

The main flow passage can define a main outlet for flame from the torch ignitor. The main outlet for flame can be radially bigger than the fuel outlet with respect to the injection axis. The torch ignitor can include a torch wall defining a combustion chamber therein. The combustion chamber can be connected to outlet flame through the flame outlet passing out of the torch wall and into the main flow passage of the fuel nozzle. A torch fuel injector can be mounted to the torch wall to issue fuel into the combustion chamber. At least one ignitor can be mounted to the torch wall, positioned to ignite fuel issued from the torch fuel injector. The combustion chamber can be connected to the flame outlet by flame tube. The flame tube and flame outlet can be oriented tangential relative to the injection axis to swirl flame from the combustion chamber around the main flow passage of the fuel nozzle.

The fuel nozzle can include an upstream air swirler of the main flow passage, the upstream air swirler defining a plurality of passages configured to impart swirl on a flow of air flowing therethrough. The plurality of passages of the upstream air swirler can be upstream of the flame outlet with respect to the downstream direction along the injection axis. The fuel nozzle can include a heat shield outboard of the nozzle body with an insulation gap defined between the heat shield and the nozzle body. The injection fuel line can pass through the heat shield and nozzle body at an upstream end of the fuel nozzle. The torch ignitor can pass through the heat shield and nozzle body. A downstream air swirler can be defined by a circumferential array of radial passages through the heat shield and nozzle body at a position downstream of the flame outlet with respect to the downstream direction along the injection axis.

The fuel nozzle can include a pressure atomizer in fluid communication with the fuel outlet at an upstream end of the nozzle body. The fuel nozzle can include an air blast atomizer in fluid communication with the fuel outlet in an upstream end of the nozzle body. The injection fuel line can be thermally isolated from the torch ignitor. The nozzle body can be conical and can open in the downstream direction along the injection axis. The nozzle body can be cylindrical. The injection fuel line and torch ignitor can define a feed arm that extends perpendicular relative to the injection axis of the fuel nozzle.

A system includes an engine case. A combustor is included within the engine case. A plurality of fuel injectors connect from outside the engine case to the combustor to issue fuel and air into the combustor for combustion. Each of the fuel injectors in the plurality of fuel injectors is as described above, with the fuel nozzle connected to the combustor to issue a spray of fuel from a fuel outlet in a downstream direction along an injection axis.

The fuel injectors of the plurality of fuel injectors can be oriented tangential relative to a main combustor axis of the combustor. The fuel injectors of the plurality of fuel injectors can be oriented radially inward relative to a main combustor axis of the combustor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
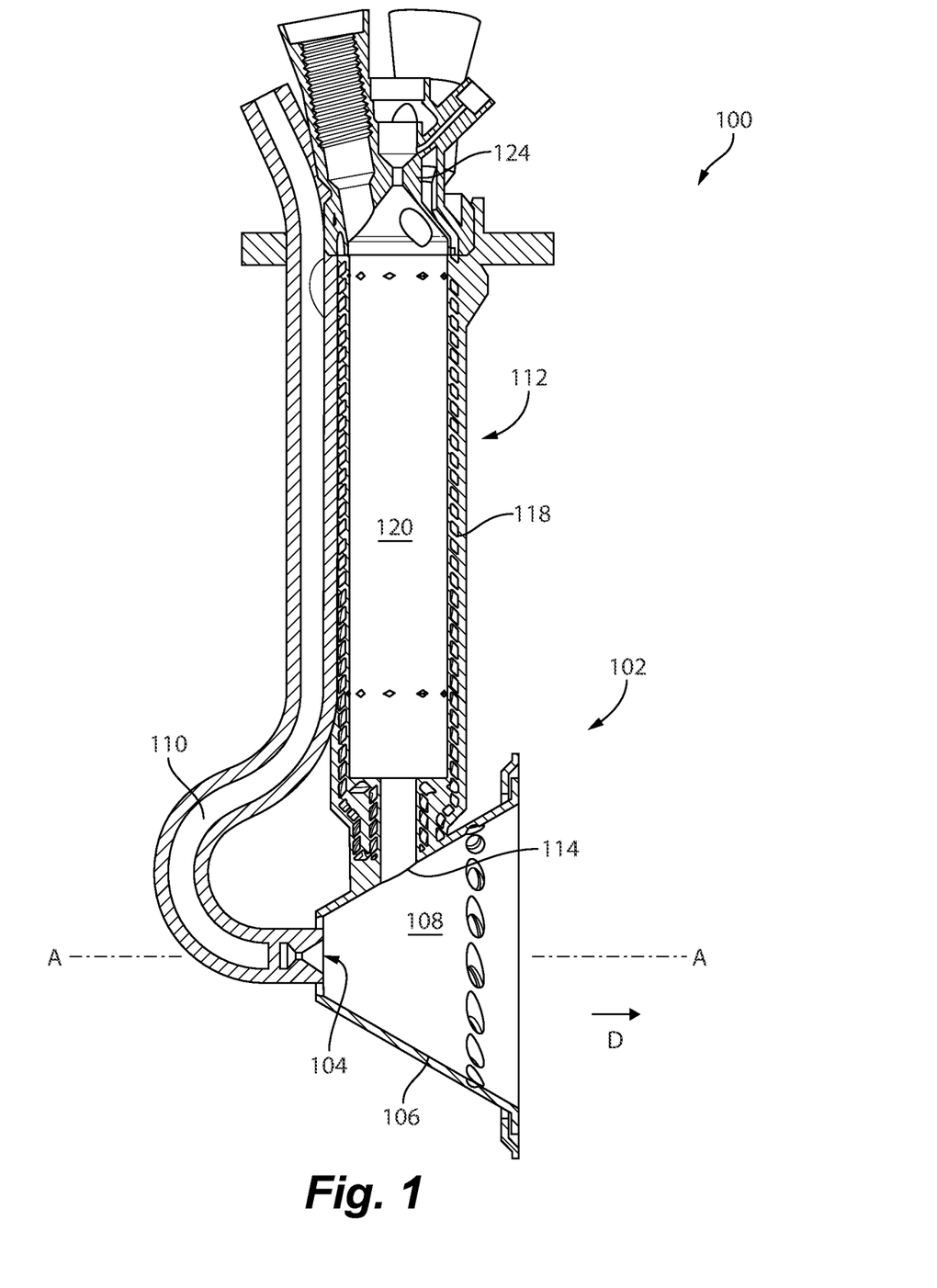
FIGS. 1-2 are schematic cross-sectional side elevation views of an injector, and a portion of the fuel injector, respectively, in accordance with the present disclosure, showing the torch ignitor, ignition fuel line, and fuel nozzle.

Reference will now be made to the drawings wherein like reference numerals identify similar structural features or aspects of the subject disclosure. For purposes of explanation and illustration, and not limitation, a partial view of an embodiment of a fuel injector in accordance with the disclosure is shown in FIG. 1 and is designated generally by reference character 100. Other embodiments of systems in accordance with the disclosure, or aspects thereof, are provided in FIGS. 2-8, as will be described. The systems and methods described herein can be used to provide fuel injectors with torch ignitors.

The fuel injector 100 includes a fuel nozzle 102 configured to issue a spray of fuel from a fuel outlet 104 in a downstream direction D along an injection axis A. The fuel nozzle 102 includes a nozzle body 106 that defines a main flow passage 108 therethrough. An injection fuel line 110 is in fluid communication with the fuel nozzle 102 to supply fuel to the fuel nozzle 102. A torch ignitor 112 with a flame outlet 114 opens into the main flow passage 108 of the fuel nozzle 102 for issuing flame into the main flow passage 108. The flame outlet 114 meets the main flow passage 108 at a position that is downstream of the fuel outlet 104 with respect to the downstream direction D along the injection axis A.

Figure 2:
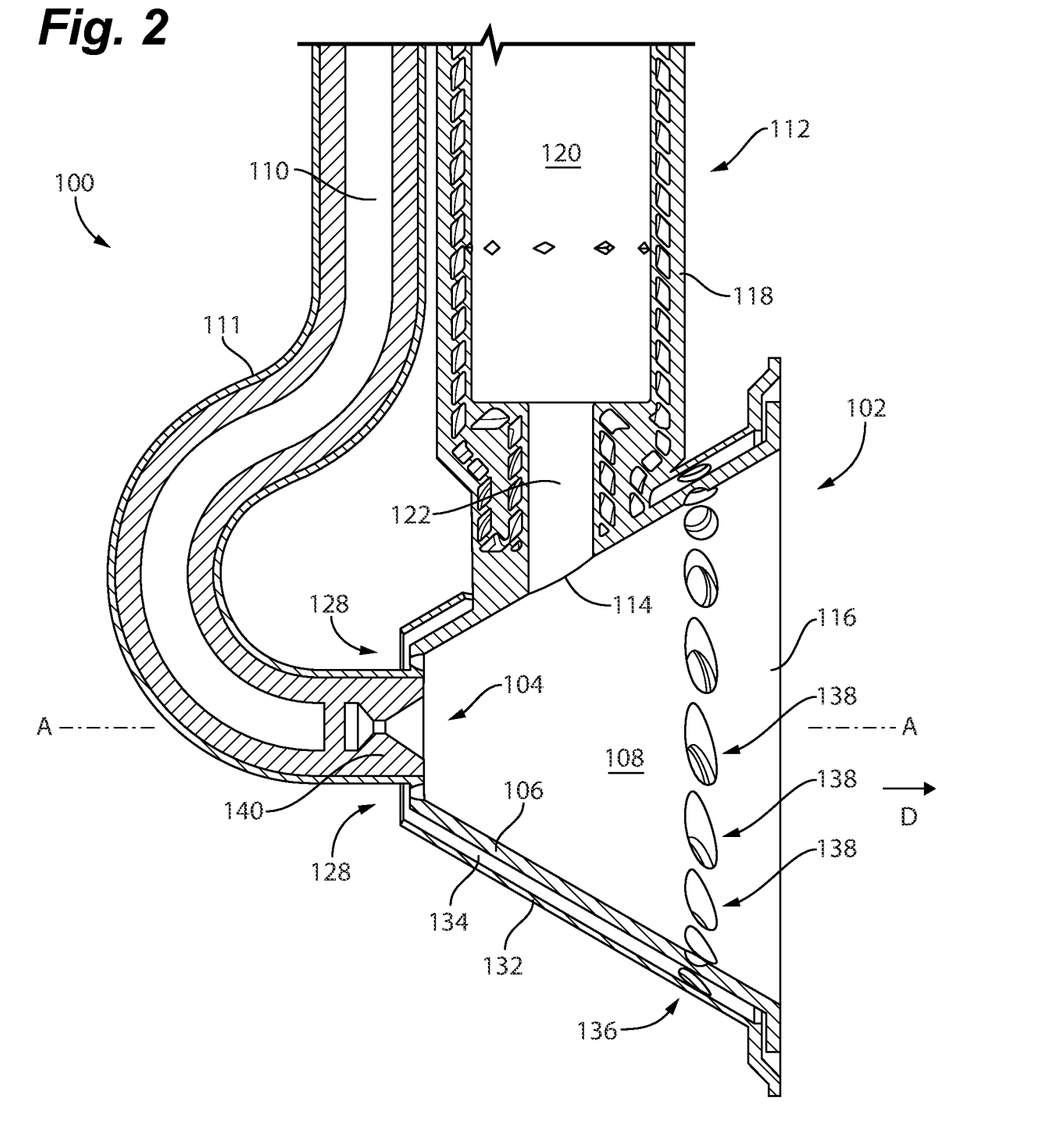
Figure 3:
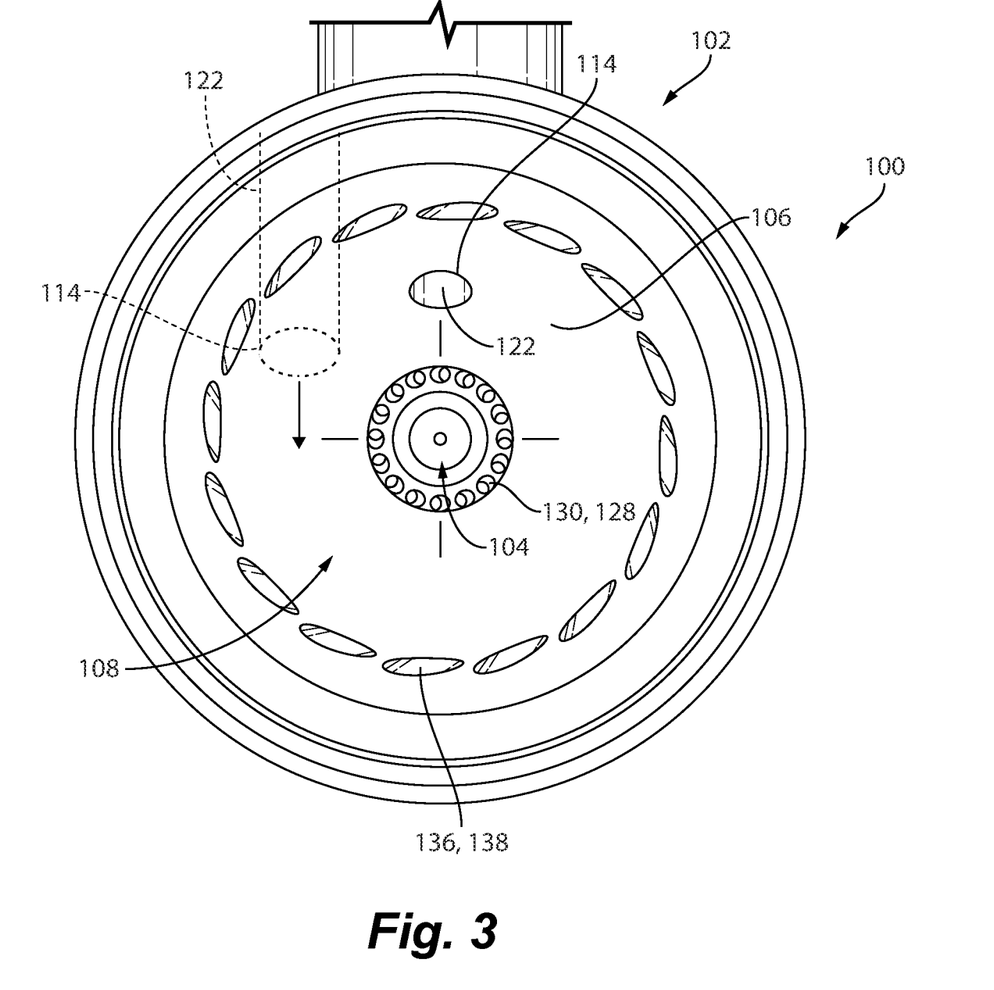
FIG. 3 is a schematic downstream elevation view the fuel injector of FIG. 2, showing possible locations for the flame outlet.

With reference now to FIG. 2, the main flow passage 108 defines a main outlet 116 for flame from the torch ignitor. The main outlet 116 for flame is radially bigger than the fuel outlet 104 with respect to the injection axis A. The torch ignitor 112 includes a torch wall 118 defining a combustion chamber 120 therein. The injection fuel line 110 is thermally isolated from the torch ignitor 112, e.g. by being spaced apart therefrom and by the heat shield 111 of the fuel tube 110. The heat shield 111 around injection fuel line 110 provides air gap which insulates the fuel line 110 to keep the fuel from getting too hot. The injection fuel line 110 and torch ignitor 112 define a feed arm that extends perpendicular relative to the injection axis A of the fuel nozzle 102. The combustion chamber 120 is connected to outlet flame through the flame outlet 114 passing out of the torch wall 118 and into the main flow passage 108 of the fuel nozzle 102. The combustion chamber 120 is connected to the flame outlet 114 by a flame tube 122. As shown in FIG. 3, the flame tube 122 and flame outlet 114 can be centered on and aligned with the central axis A, or as indicated in broken lines in FIG. 3, they can be oriented tangential (offset as shown in FIG. 3) relative to the injection axis A to swirl flame from the combustion chamber 120 around the main flow passage 108 of the fuel nozzle 102. The tangential orientation can help the flame from the torch 112 it to go more with the main air flow path in the main flow passage 108 rather than interrupt it.

With reference again to FIG. 1, a torch fuel injector 124 is mounted to the fitting portion of the torch wall 118 to issue fuel into the combustion chamber 120. At least one ignitor 126 (not shown in FIG. 1, but see FIG. 6) is mounted to fixture portion of the torch wall 118, passing through the torch wall 118 into the combustion chamber 120, positioned to ignite fuel issued from the torch fuel injector 124.

With reference again to FIG. 2, the fuel nozzle 102 includes an upstream air swirler 128 of the main flow passage 108. The upstream air swirler 128 defines a plurality of circumferentially distributed passages 130, labeled in FIG. 3, configured to impart swirl on a flow of air flowing therethrough. The plurality of passages 130 of the upstream air swirler are upstream of the flame outlet 114 with respect to the downstream direction D along the injection axis A. The fuel nozzle 102 includes a heat shield 132 outboard of the nozzle body 106 with an insulation gap 134 defined between the heat shield 132 and the nozzle body 106. The injection fuel line 110 passes through the heat shield 132 and nozzle body 106 at an upstream end of the fuel nozzle 102.

The torch ignitor 112 including the flame outlet 114 passes through the heat shield 132 and nozzle body 106. A downstream air swirler 136 is defined by a circumferential array of radial passages 138 through the heat shield 132 and nozzle body 106 at a position downstream of the flame outlet 114 with respect to the downstream direction D along the injection axis A.

The fuel nozzle 102 is allowed to grow (under thermal expansion/contraction) at different rates than heat shield 132, which is not fixed at both ends to prevent breaking due to differential thermal expansion). The dome or backside surfaces can be back side cooled, e.g. by flow through the gap 134, similarly to the cooling in the torch wall 118 to prevent heat from oxidizing the material.

Figure 4:
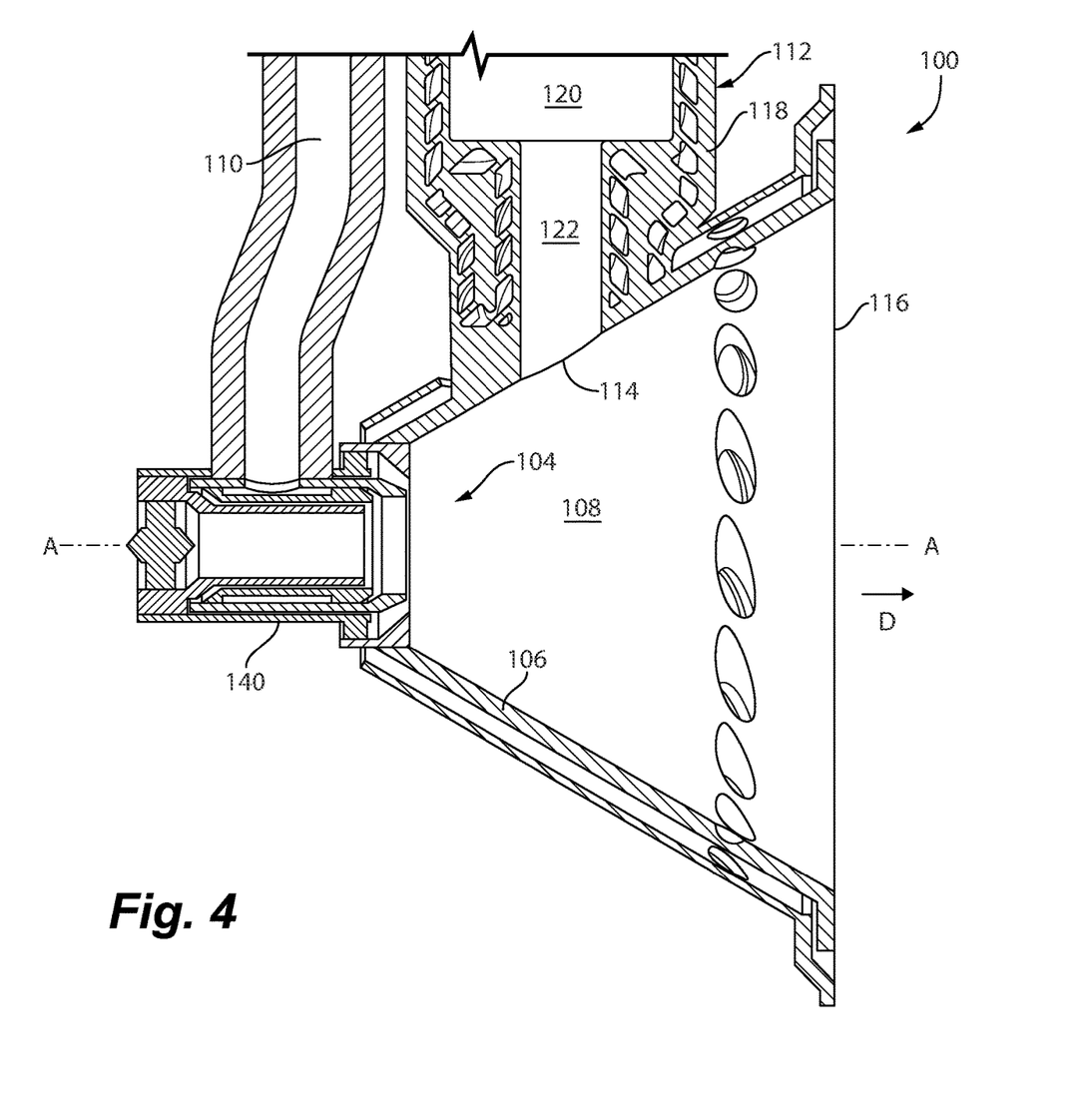
FIG. 4 is a schematic cross-sectional side elevation view of a portion of the fuel injector of FIG. 2, showing an air blast injector at the upstream end of the nozzle body.
Figure 5:
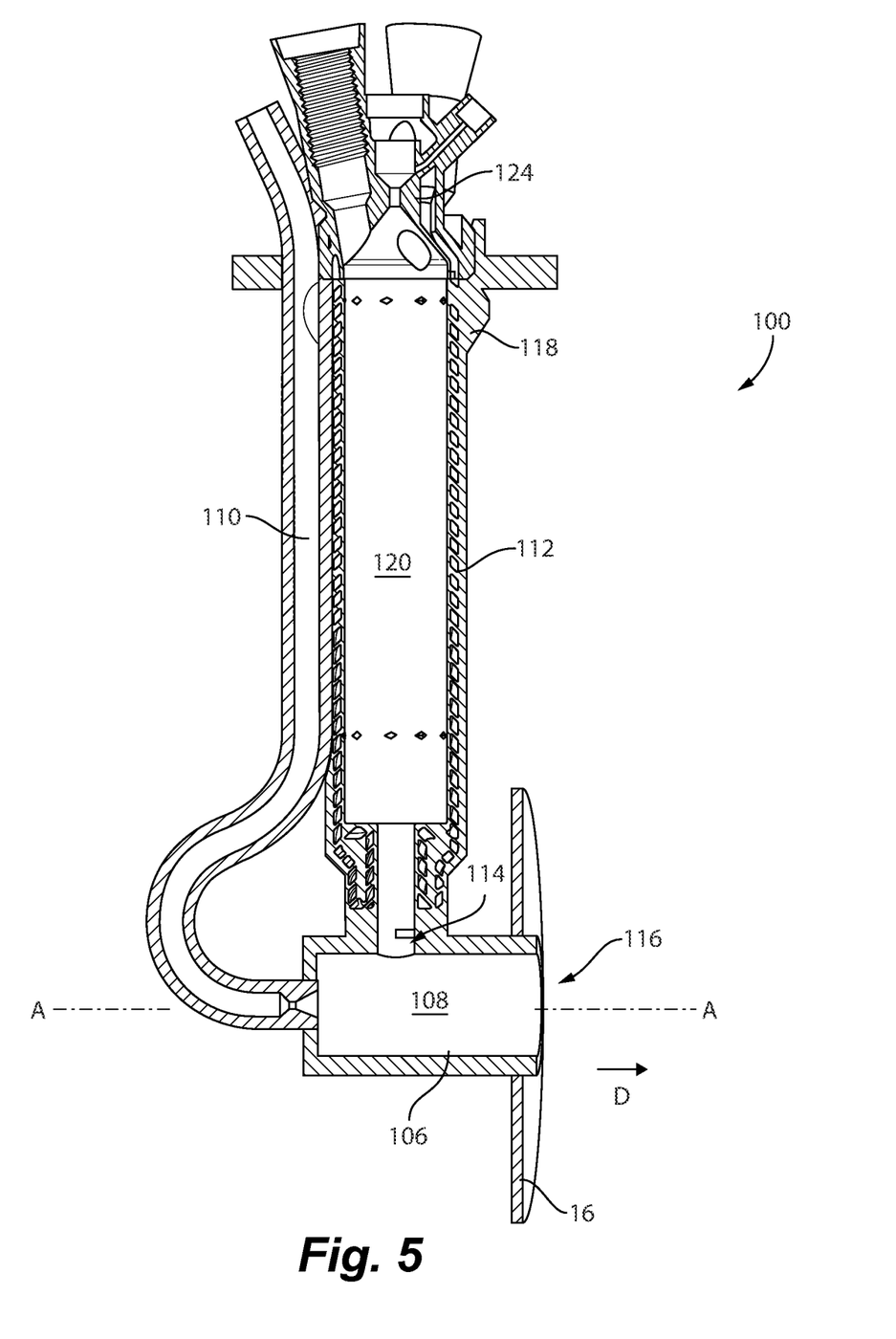
FIG. 5 is a schematic cross-sectional side elevation view of the fuel injector of FIG. 1, showing a cylindrical nozzle body.

The fuel nozzle 102 includes a pressure atomizer 140 in the outlet end of the fuel line 110 in fluid communication with the fuel outlet 104 at an upstream end of the nozzle body 102. However, as shown in FIG. 4, it is also contemplated that the fuel nozzle 102 can instead include an air blast atomizer 140 in fluid communication with the fuel outlet 104 in the upstream end of the nozzle body 102. The nozzle body 102 as shown in FIG. 2 is conical and opens in the downstream direction D along the injection axis A. However, it is also contemplated that any suitable nozzle body shape can be used, such as the cylindrical nozzle body 106 in FIG. 5.

Figure 6:
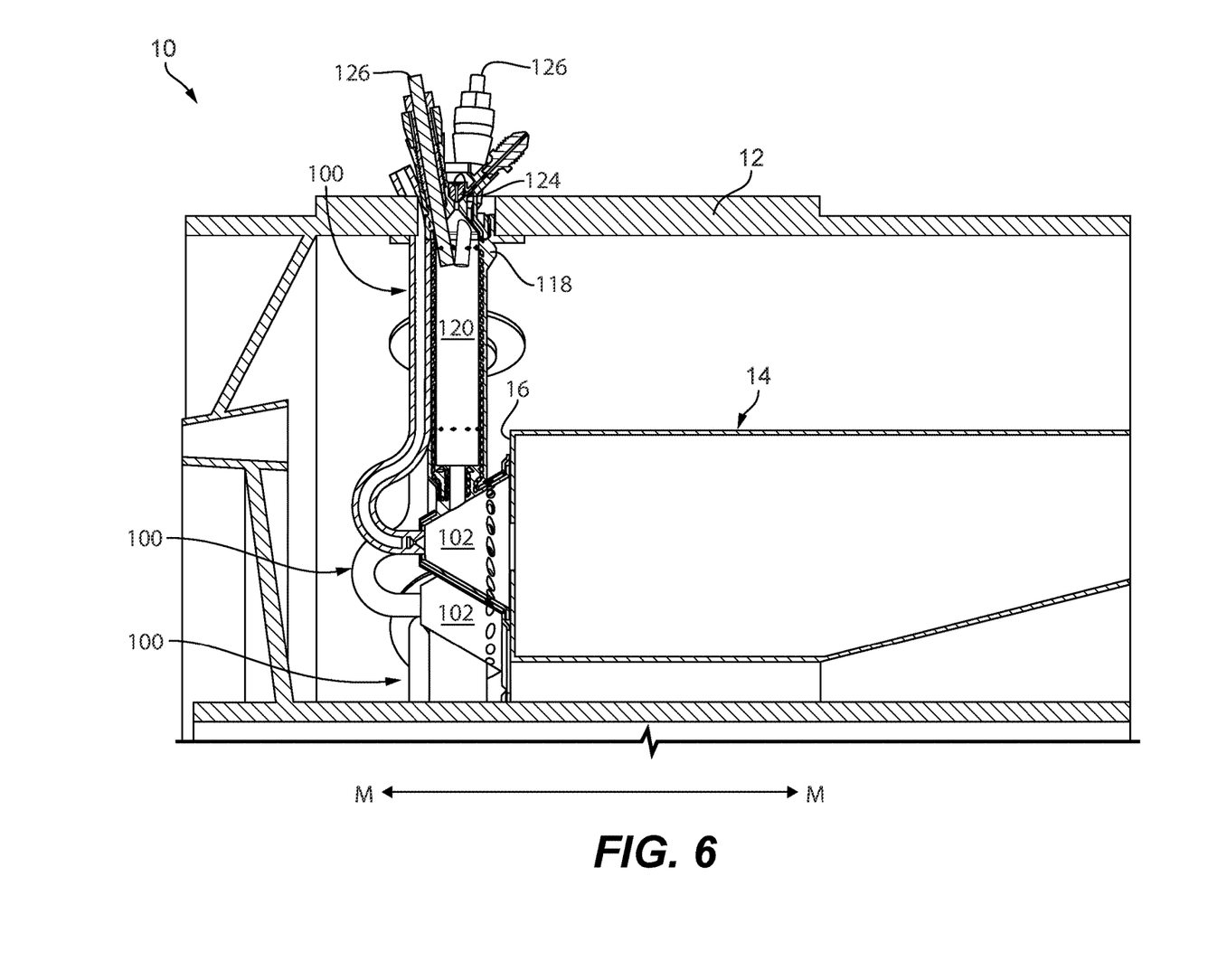
FIG. 6 is a cross-sectional perspective view of a system incorporating fuel injectors of FIG. 1.
Figure 7:
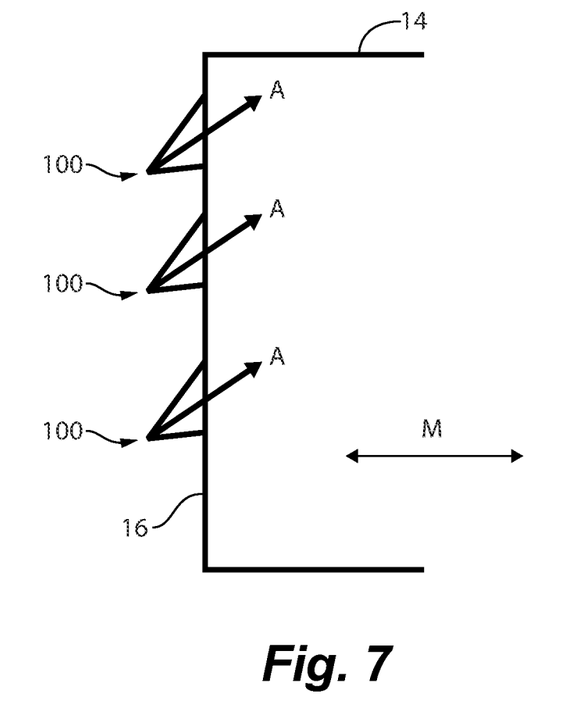
FIGS. 7-8 are schematic plan and side elevation views, respectively, of the system of FIG. 6, showing possible orientations of the fuel injectors.
Figure 8:
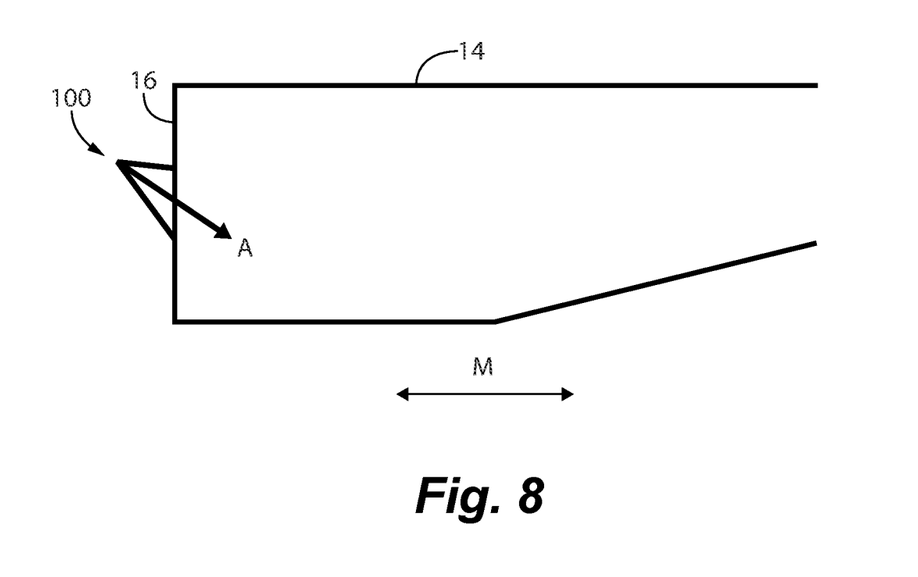

With reference now to FIG. 6, a system 10 includes an engine case 12, e.g. of a gas turbine engine, with a combustor 14 included within the engine case 12. A plurality of fuel injectors 100 as described above connect from outside the engine case 12 to the upstream combustor dome wall 16 of the combustor 14 to issue fuel and air into the combustor 14 for combustion. Each of the fuel injectors 100 has its respective fuel nozzle 102 operatively connected (or associated even if it is not a hard connection) to the combustor 14 to issue a spray of fuel from the fuel outlet 104 (labeled in FIG. 2) in a downstream direction along the injection axis A (labeled in FIG. 2). While the fuel injectors 100 are shown oriented axially with the injection axes A aligned with the main axis M (which is schematically indicated in FIG. 6) of the combustor 14 and engine case 12, it is also contemplated that the fuel injectors 100 can be oriented tangential relative to the main combustor M axis of the combustor 14, as shown schematically in the plan view of in FIG. 7. This can allow for inducing swirl around the annular volume of the combustor 14. It is also contemplated as shown schematically in FIG. 8 (which is viewed from the same cross-sectional view as in FIG. 6), that the injection axes A of the fuel injectors 100 can be oriented radially inward or outward relative to a main combustor axis M of the combustor 14.

In a gas turbine engine, replacement of one or more traditional fuel injectors with a continuous ignition device as disclosed herein allows complete control of each individual injection. This permits a large degree of fuel staging while still maintaining stability since each injection/torch system is independently controlled and isolated from disruptions of neighboring systems.

Potential benefits include the following. Systems and methods as disclosed herein can allow extensive turndown (one torch device can remain stable while all others are turned off, for example. They can allow extensive redundancy, e.g. even if one or more torch devices fail through some failure modes, others can be adjusted to compensate until replacement can occur. Light-around problems can be reduced or eliminated. Systems and methods as disclosed herein can greatly improve altitude relight as multiple systems can be simultaneously ignited. There can be a reduction in the probability of altitude flameout. Individual injector/torch control can be used to break acoustic issues. Further devices can be employed in the main combustor to allow for adequate temperature uniformity and combustion efficiency such as air swirlers surrounding the torches, dilution jets, and combustion liner cooling features. Torches can be aimed to maximize performance. For example, the elbow between the torch ignitor 112 and the fuel nozzle 102 can be given a partially tangential direction to improve main combustor mixing, as indicated in FIG. 3, and can even have a tilt to the left or right as oriented as in FIG. 3 to suit given applications. Torches can be oriented for convenient locations and also to improve/maximize performance. Health monitoring can be setup for each fuel injector to provide feedback to monitor and improve overall health. For example, thermocouples can be used as sensors for detecting flames and temperatures of each torch device. This can be coupled with individual control valves to increase/decrease the fuel flow to an individual device if its performance needs adjusted. Power through the ignitors 126, e.g. glow plugs, can be turned on if the device is not lit.

The methods and systems of the present disclosure, as described above and shown in the drawings, provide for fuel injectors with torch ignitors. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fuel injector comprising:
a fuel nozzle configured to issue a spray of fuel from a fuel outlet in a downstream direction along an injection axis, the fuel nozzle including a nozzle body that defines a main flow passage therethrough;
an injection fuel line in fluid communication with the fuel nozzle to supply fuel to the fuel nozzle; and
a torch ignitor with a flame outlet opening into the main flow passage of the fuel nozzle for issuing flame into the main flow passage, wherein the flame outlet meets the main flow passage at a position that is downstream of the fuel outlet with respect to the downstream direction along the injection axis, wherein the torch ignitor includes a torch wall defining a combustion chamber therein, wherein the combustion chamber is connected to outlet flame through the flame outlet passing out of the torch wall and into the main flow passage of the fuel nozzle, wherein the injection fuel line and the combustion chamber of the torch ignitor define a feed arm that extends perpendicular relative to the injection axis of the fuel nozzle.

2. The fuel injector as recited in claim 1, wherein the main flow passage defines a main outlet for flame from the torch ignitor, and wherein the main outlet for flame is radially bigger than the fuel outlet with respect to the injection axis.

3. The fuel injector as recited in claim 1, wherein the torch ignitor includes:
a torch fuel injector mounted to the torch wall to issue fuel into the combustion chamber; and
at least one ignitor mounted to the torch wall, positioned to ignite fuel issued from the torch fuel injector.

4. The fuel injector as recited in claim 3, wherein the combustion chamber is connected to the flame outlet by a flame tube.

5. The fuel injector as recited in claim 4, wherein the flame tube and flame outlet are oriented tangential relative to the injection axis to swirl flame from the combustion chamber around the main flow passage of the fuel nozzle.

6. The fuel injector as recited in claim 1, wherein the fuel nozzle includes an upstream air swirler of the main flow passage, the upstream air swirler defining a plurality of passages configured to impart swirl on a flow of air flowing therethrough.

7. The fuel injector as recited in claim 6, wherein the plurality of passages of the upstream air swirler are upstream of the flame outlet with respect to the downstream direction along the injection axis.

8. The fuel injector as recited in claim 6, wherein the fuel nozzle includes a heat shield outboard of the nozzle body, with an insulation gap defined between the heat shield and the nozzle body.

9. The fuel injector as recited in claim 8, wherein the injection fuel line passes through the heat shield and nozzle body at an upstream end of the fuel nozzle.

10. The fuel injector as recited in claim 8, wherein the torch ignitor passes through the heat shield and nozzle body.

11. The fuel injector as recited in claim 8, wherein a downstream air swirler is defined by a circumferential array of radial passages through the heat shield and nozzle body at a position downstream of the flame outlet with respect to the downstream direction along the injection axis.

12. The fuel injector as recited in claim 1, wherein the fuel nozzle includes a pressure atomizer in fluid communication with the fuel outlet at an upstream end of the nozzle body.

13. The fuel injector as recited in claim 1, wherein the fuel nozzle incudes an air blast atomizer in fluid communication with the fuel outlet in an upstream end of the nozzle body.

14. The fuel injector as recited in claim 1, wherein the injection fuel line is thermally isolated from the torch ignitor.

15. The fuel injector as recited in claim 1, wherein the nozzle body is conical and opens in the downstream direction along the injection axis.

16. The fuel injector as recited in claim 1, wherein the nozzle body is cylindrical.

17. A system comprising:
an engine case;
a combustor within the engine case;
a plurality of fuel injectors connecting from outside the engine case to the combustor to issue fuel and air into the combustor for combustion, wherein each of the fuel injectors in the plurality of fuel injectors includes:
a fuel nozzle connected to the combustor to issue a spray of fuel from a fuel outlet in a downstream direction along an injection axis, the fuel nozzle including a nozzle body that defines a main flow passage therethrough;
an injection fuel line in fluid communication with the fuel nozzle to supply fuel to the fuel nozzle; and
a torch ignitor with a flame outlet opening into the main flow passage of the fuel nozzle for issuing flame into the main flow passage, wherein the flame outlet meets the main flow passage at a position that is downstream of the fuel outlet with respect to the downstream direction along the injection axis, wherein the torch ignitor includes a torch wall defining a combustion chamber therein, wherein the combustion chamber is connected to outlet flame through the flame outlet passing out of the torch wall and into the main flow passage of the fuel nozzle, wherein the injection fuel line and the combustion chamber of the torch ignitor define a feed arm that extends perpendicular relative to the injection axis of the fuel nozzle.

18. The system as recited in claim 17, wherein the fuel injectors of the plurality of fuel injectors are oriented tangential relative to a main combustor axis of the combustor.

19. The system as recited in claim 17, wherein the fuel injectors of the plurality of fuel injectors are oriented radially inward relative to a main combustor axis of the combustor.

* * * * *